United States Patent [19]
Olson et al.

[11] Patent Number: 6,150,440
[45] Date of Patent: Nov. 21, 2000

[54] UV LIGHT ABSORBING MATERIAL COMPRISING A CARBOXYLIC POLYMER AND AN AMIDE COMPOUND, FILMS, PRODUCTS, AND METHODS OF USE

[75] Inventors: David B. Olson, May Township; David M. Burns, Woodbury, both of Minn.

[73] Assignee: 3M Innovative Properties Company, St. Paul, Minn.

[21] Appl. No.: 09/146,904

[22] Filed: Sep. 4, 1998

Related U.S. Application Data

[62] Division of application No. 08/642,551, May 3, 1996, Pat. No. 5,994,431.

[51] Int. Cl.$^7$ .................................................. C08K 5/3415
[52] U.S. Cl. .......................... 524/91; 524/94; 524/522; 524/570; 525/522; 430/495.1; 430/931
[58] Field of Search ..................................... 525/193, 194, 525/186, 221; 430/512, 495.1, 931; 524/91, 94, 522, 570

[56] References Cited

U.S. PATENT DOCUMENTS

| | | |
|---|---|---|
| 3,267,113 | 8/1966 | Carboni . |
| 3,272,891 | 9/1966 | Milionis et al. . |
| 3,337,356 | 8/1967 | Carboni . |
| 4,027,081 | 5/1977 | Turner . |
| 4,767,659 | 8/1988 | Bailey et al. . |
| 4,778,728 | 10/1988 | Lucas . |
| 4,785,063 | 11/1988 | Slongo et al. . |
| 4,853,471 | 8/1989 | Rudy et al. . |
| 4,868,246 | 9/1989 | MacLeay et al. . |
| 4,892,915 | 1/1990 | Slongo et al. . |
| 4,973,702 | 11/1990 | Rody et al. . |
| 4,996,326 | 2/1991 | Leppard et al. . |
| 5,021,478 | 6/1991 | Ravichandran et al. . |
| 5,032,498 | 7/1991 | Rudy et al. .............................. 430/512 |
| 5,085,918 | 2/1992 | Rajan et al. . |
| 5,096,781 | 3/1992 | Vieira et al. . |
| 5,096,948 | 3/1992 | Kurumada et al. . |
| 5,096,949 | 3/1992 | Lai et al. . |
| 5,194,113 | 3/1993 | Lasch et al. . |
| 5,227,194 | 7/1993 | De La Sierre . |
| 5,627,227 | 5/1997 | Sug et al. . |

FOREIGN PATENT DOCUMENTS

| | | |
|---|---|---|
| 057 160 | 8/1982 | European Pat. Off. . |
| 0 315 155 | 5/1989 | European Pat. Off. . |
| 342 974 | 11/1989 | European Pat. Off. . |
| 593 936 | 4/1994 | European Pat. Off. . |
| 657 577 | 6/1995 | European Pat. Off. . |
| WO 97 42261 | 11/1997 | WIPO . |
| WO 98 03489 | 1/1998 | WIPO . |

OTHER PUBLICATIONS

ASTM E 810—Standard Test Method for Coefficient of Retroreflection of Retroreflective Sheeting, Apr. 1994.
ASTM G 23 Type E—Standard Practice for Operating Light–Exposure Apparatus (Carbon–Arc Type) With and Without Water for Exposure of Nonmetallic Materials, Mar. 1995.
*Advanced Organic Chemistry*, 3$^{rd}$ Ed., John Wiley & Sons, Mar. 1985, pp. 71–73.
*Encyclopedia of Polymer Science and Engineering*, vol. 6, Wiley & Sons, 1986, pp. 404–408 and 420–424.
*Chem Soc. Rev.*, "Structure in Solvents and Solutions—NMR and Vibrational Spectroscopic Studies," vol. 12, 1983, pp. 1–34.
Databases "Chemical Abstracts, Registry," Abs. 101: 231 645 and R.N.'s 24991–11–5, 29467–65–0, Columbus, OH and JP A 59 130 505 27 Jul. 1984.
Article "Photostabilization of Polymers," J.F. Rabek 1990.
Chemical Abstracts—vol. 115, No. 9 of Sep. 2, 1991—Columbus Ohio, US; Abstract No. 92277, Golubski, Z.: Preparation of—XP002070742, See abstract & PL 152 683B.

*Primary Examiner*—David W. Wu
*Assistant Examiner*—Kelechi C. Egwim
*Attorney, Agent, or Firm*—Doreen S. L. Gwin

[57] ABSTRACT

An ultraviolet light absorbing material that resists blooming and migration is made up of a carboxyl functional polymer and an amide functional ultraviolet light absorbing compound, wherein the carboxyl functional polymer and the amide functional ultraviolet light absorbing compound are hydrogen bonded to one another. Polymeric films that contain a polyolefin and the ultraviolet light absorbing material are useful as the top layer in multilayer constructions such as retroreflective sheetings and conformable marking sheets.

26 Claims, 2 Drawing Sheets

UV LIGHT ABSORBING MATERIAL COMPRISING A CARBOXYLIC POLYMER AND AN AMIDE COMPOUND, FILMS, PRODUCTS, AND METHODS OF USE

This is a divisional of application No. 08/642,551 filed May 3, 1996, now U.S. Pat. No. 5,994,431.

FIELD OF THE INVENTION

This invention relates to ultraviolet light absorbing materials that comprise a carboxyl functional polymer and an amide functional ultraviolet light absorbing compound. The invention also relates to polyolefin films that incorporate the ultraviolet light absorbing materials and to articles that include the polyolefin films.

BACKGROUND OF THE INVENTION

The effect of ultraviolet light on articles such as retroreflective sheetings for use on license plates or signage articles that are exposed to the sun or other sources of ultraviolet light are of great concern to the manufacturers of such articles. Over time, constant or repeated exposure to ultraviolet light can result in fading of the dyes and pigments used in such articles and in the degradation or breakdown of the adhesives, polymers, and other materials used in the construction of the articles. This fading and degradation shortens the useful life of the articles in question, making protection from ultraviolet light exposure an issue of great importance to the manufacturers of such articles.

Molecules that function as ultraviolet light absorbers are generally known in the art. For example, in U.S. Pat. No. 4,853,471 Rody et al. describe 2-(2-hydroxyphenyl)-benzotriazole compounds that are useful as ultraviolet light absorbers. These compounds are described as useful in the stabilization of a wide variety of polymeric materials against ultraviolet light, particularly those that are used in the preparation of photographic materials. Other classes of ultraviolet light absorbers include the 2-hydroxybenzophenones and the diphenylcyanoacrylates.

While such compounds are known to absorb ultraviolet light, their incompatibility with the polyolefins often used as the top film in multilayer sheetings has limited their usefulness in such constructions. The low solubility and high mobility of typical ultraviolet light absorbers in polyolefins results in an inability to maintain high levels of these compounds in polyolefin films; the compounds tend to bloom or migrate out of the film, and the protective properties of the compounds are lost.

Therefore, a need exists for ultraviolet light absorbing materials that are compatible with and resist blooming out of polyolefins, and for products such as polyolefin films and other articles that incorporate such a material.

SUMMARY OF THE INVENTION

The invention provides an ultraviolet light absorbing material made up of a carboxyl functional polymer and an amide functional ultraviolet light absorbing compound, wherein the ultraviolet light absorbing compound is hydrogen bonded to the carboxyl functional polymer and there is at least one hydrogen bonding site on the polymer per mole of ultraviolet light absorbing compound.

The invention also provides a polymeric film made up of a polyolefin and an ultraviolet light absorbing material, said ultraviolet light absorbing material made up of a carboxyl functional polymer and an amide functional ultraviolet light absorbing compound, wherein the amide functional ultraviolet light absorbing compound is hydrogen bonded to the carboxyl functional polymer and there is at least one hydrogen bonding site on the polymer per mole of ultraviolet light absorbing compound.

The invention further provides a method of protecting a substrate from the effects of ultraviolet light, the method comprising applying a polymeric film to the substrate, said film comprising a polyolefin and an ultraviolet light absorbing material, said ultraviolet light absorbing material comprising a carboxyl functional polymer and an amide functional ultraviolet light absorbing compound, wherein the ultraviolet light absorbing compound is hydrogen bonded to the carboxyl functional polymer and there is at least one hydrogen bonding site on the polymer per mole of ultraviolet light absorbing compound.

In addition the invention provides products such as retroreflective sheetings, signage articles and conformable marking sheets that comprise the polymer films of the invention. In one such aspect the invention provides a conformable marking sheet comprising a top polymeric film layer having glass microspheres and skid resistant particles partially embedded therein, the film comprising a polyolefin and an ultraviolet light absorbing material, the ultraviolet light absorbing material comprising a carboxyl functional polymer and an amide functional light absorbing compound, wherein the amide functional ultraviolet light absorbing compound is hydrogen bonded to the carboxyl functional polymer and there is at least one hydrogen bonding site on the polymer per mole of ultraviolet light absorbing compound; an optional base layer, e.g., comprising a deformable thermoplastic polymer and a nonreinforcing mineral particulate; an optional adhesive layer, e.g., pressure sensitive adhesive; and an optional release liner.

In another aspect of the invention is provided an enclosed-lens retroreflective sheeting, e.g., comprising a layer of lenses anchored in a binder layer, a specularly reflective layer underlying the lenses, and a top layer comprising a polymeric film, said film comprising a polyolefin and an ultraviolet light absorbing material, said ultraviolet light absorbing material comprising a carboxyl functional polymer and an amide functional ultraviolet light absorbing compound, wherein the amide functional ultraviolet light absorbing compound is hydrogen-bonded to the carboxyl functional polymer and there is at least 1 hydrogen bonding site on the polymer per molecule of ultraviolet light absorbing compound. Embedded-lens retroreflective sheetings and encapsulated-lens retroreflective sheetings may be made in accordance with the invention. Retroreflective signs and articles including such sheetings are also provided.

The term "polymer" is used herein to refer to compounds that have more than one occurrence of a given monomeric structural unit.

As used herein the term "amide functional ultraviolet light absorbing compound" refers to a compound that absorbs ultraviolet light and that contains at least one —CONH— moiety. The term "UVA" is used interchangeably with the term "amide functional ultraviolet light absorbing compound".

The term "carboxyl bearing polymer" refers to polymers that have one or more carboxylic acid, or —COOH, groups pendant to the polymer backbone. This term is inclusive of copolymers of carboxyl bearing monomers and other monomers as well as homopolymers and copolymers of different carboxyl bearing monomers.

The term "polyolefin" is used to refer to polymers derived from at least one ethylenically unsaturated monomer. This term includes copolymers of ethylenically unsaturated monomers and other monomers, as well as homopolymers and copolymers of different ethylenically unsaturated monomers.

DETAILED DESCRIPTION OF THE INVENTION

The Ultraviolet Light Absorbing Material

Figure 1:
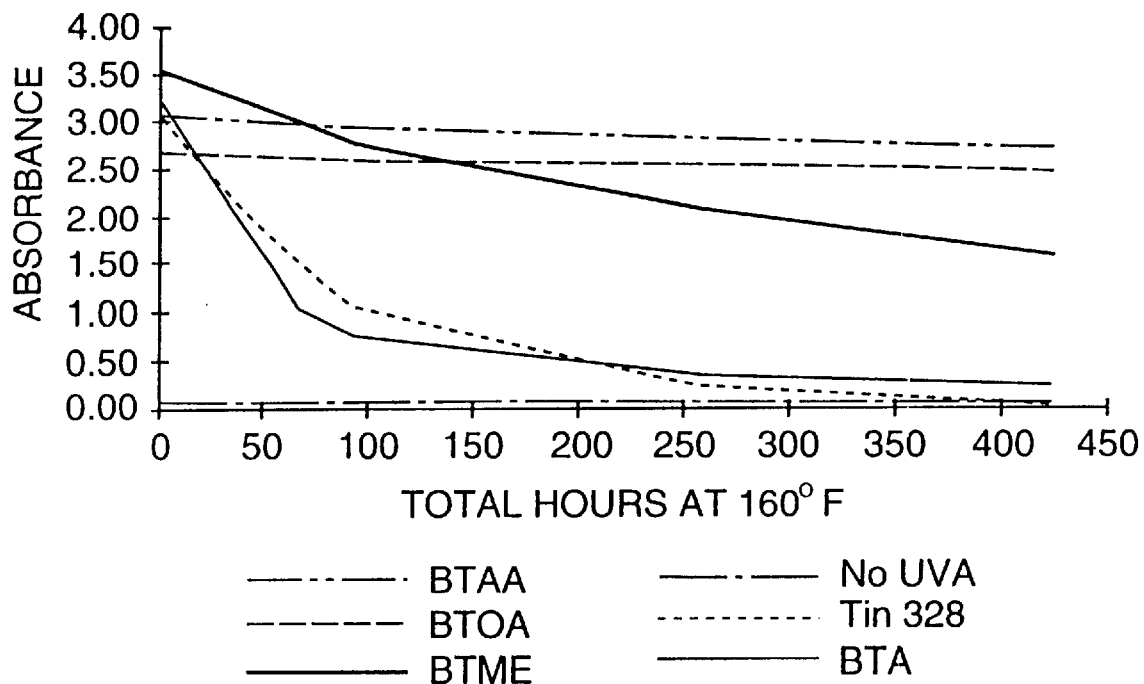
FIG. 1 shows the retention of ultraviolet light absorbing compounds in an ethylene-acrylic acid copolymer (EAA) when subjected to heat aging.

As described above, the ultraviolet light absorbing material of the invention is composed of an amide functional light absorbing compound and a carboxyl bearing polymer. In these materials there is at least one hydrogen bonding site present on the carboxyl bearing polymer per mole of ultraviolet light absorbing compound and the amide functional ultraviolet light absorbing compound is hydrogen bonded to the carboxyl bearing polymer.

In addition to absorbing ultraviolet light, the UVAs useful in the invention are preferably transparent to visible light. Useful classes of amide functional ultraviolet light absorbing compounds include amide containing 2-hydroxyphenylbenzotriazoles, 2-hydroxybenzophenones, and diphenylcyanoacrylates.

Any 2-hydroxyphenylbenzotriazole ultraviolet light absorbing compound that contains an amide group may be used in the material of the invention. Suitable 2-hydroxyphenylbenzotriazole compounds include those having formula (I):

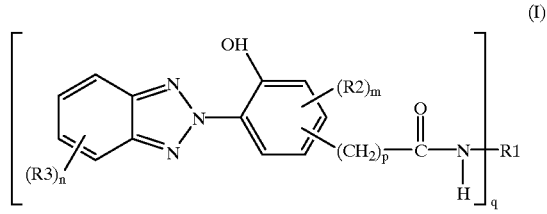

(I)

wherein R1 is straight-chain or branched $C_1$–$C_{18}$ alkyl, straight-chain or branched $C_3$–$C_{18}$ alkyl which is interrupted by O, S, or —NR4-, $C_5$–$C_{12}$ cycloalkyl, $C_6$–$C_{14}$ aryl, $C_7$–$C_{15}$ aralkyl, straight-chain or branched $C_3$–$C_8$ alkenyl, $C_1$–$C_3$ hydroxyalkyl or

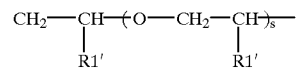

wherein R1' is H or straight-chain or branched $C_{1-6}$ alkyl; R4 is H, straight-chain or branched $C_1$–$C_{18}$ alkyl, $C_6$–$C_{12}$ cycloalkyl, straight-chain or branched $C_3$–$C_8$ alkenyl, $C_6$–$C_{14}$ aryl or $C_7$–$C_{18}$ aralkyl;

each R2 is independently halogen, hydroxy, straight-chain or branched $C_{1-6}$ alkyl, straight-chain or branched $C_{1-6}$ alkoxy, straight-chain or branched $C_{1-6}$ alkanol, amino, straight-chain or branched $C_{1-6}$ alkylamino, or straight-chain or branched $C_{1-6}$ dialkylamino;

each R3 is independently halogen, hydroxy, straight-chain or branched $C_{1-6}$ alkyl, straight-chain or branched $C_{1-6}$ alkoxy, straight-chain or branched $C_{1-6}$ alkanol, amino, straight-chain or branched $C_{1-6}$ alkylamino, or straight-chain or branched $C_{1-6}$ dialkylamino;

m is 0 to 3;

n is 0 to 4;

p is 1 to 6;

q is 1 or 2; and s is 2 to 10.

Of these, 2-hydroxyphenylbenzotriazole compounds having formula (II) are preferred:

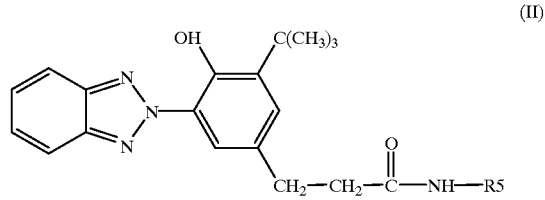

(II)

wherein R5 is straight-chain or branched $C_8$ alkyl.

Another useful class of ultraviolet light absorbing compounds is the 2-hydroxybenzophenones. So long as they contain at least one amide group, any of the 2-hydroxybenzophenone ultraviolet light absorbing compounds may be used. Examples of 2-hydroxybenzophenone compounds that may be used in the invention include those of formula (III):

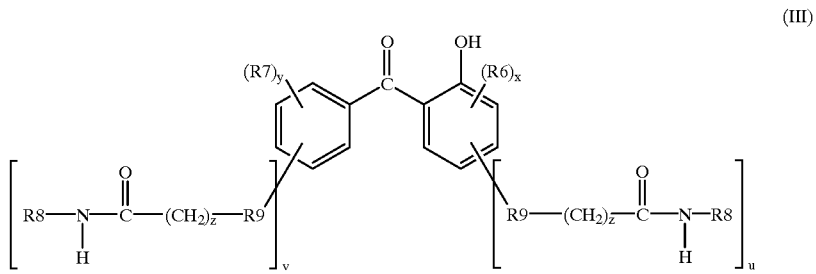

(III)

wherein each R9 is independently a covalent bond, —O—, —S—, —CO—, or —NR10-; each R8 is independently straight-chain or branched $C_1$–$C_{18}$ alkyl, straight-chain or branched $C_3$–$C_{18}$ alkyl which is interrupted by O, S or —NR10-, $C_5$–$C_{12}$ cycloalkyl, $C_6$–$C_{14}$ aryl, $C_7$–$C_{15}$ aralkyl, straight-chain or branched $C_3$–$C_8$ alkenyl, or $C_1$–$C_3$ hydroxyalkyl; R10 is H, straight-chain or branched $C_1$–$C_{18}$ alkyl, $C_6$–$C_{12}$ cycloalkyl, straight-chain or branched $C_3$–$C_8$ alkenyl, $C_6$–$C_{14}$ aryl or $C_7$–$C_{18}$ aralkyl;

each R6 is independently halogen, hydroxy, straight-chain or branched $C_{1-8}$ alkyl, straight-chain or branched $C_{1-18}$ alkoxy, straight-chain or branched $C_{1-18}$ alkanol, amino, straight-chain or branched $C_{1-6}$ alkylamino, or straight-chain or branched $C_{1-6}$ dialkylamino;

each R7 is independently halogen, hydroxy, straight-chain or ranched $C_{1-8}$ alkyl, straight-chain or branched $C_{1-18}$ alkoxy, straight-chain or branched $C_{1-18}$ alkanol, amino, straight-chain or branched $C_{1-6}$ alkylamino, or straight-chain or branched $C_{1-6}$ dialkylamino;

u and v are independently 0 or 1, provided that u+v=at least 1;

x is 0 to 4;

y is 0 to 5; and each z is independently 0 to 6.

2-hydroxybenzophenone compounds of formula (III) may be prepared by methods known in the art, such as by the reaction of an acid of formula

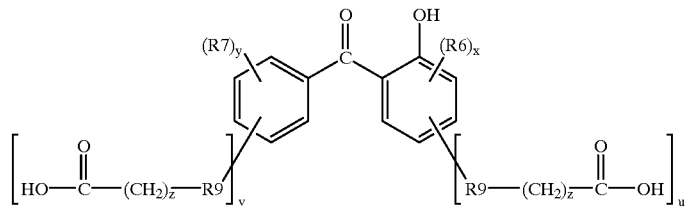

with the corresponding amine.

Examples of particular 2-hydroxybenzophenone compounds useful in the invention include compounds of formulas (IV) or (V):

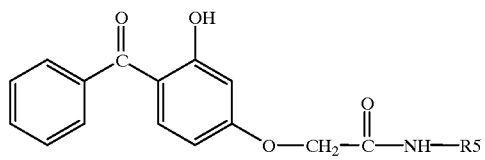

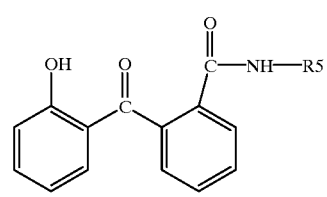

wherein R5 is a straight-chain or branched $C_8$ alkyl group.

Diphenylcyanoacrylamide or diphenylcyanoacrylate ultraviolet light absorbing compounds may also be used, so long as they contain at least one amide group. Examples of useful diphenylcyanoacrylamide compounds include those of formula (VI):

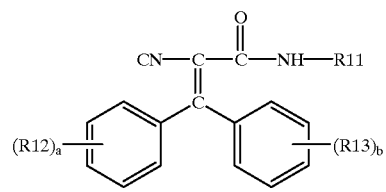

wherein R11 is straight-chain or branched $C_1$–$C_{18}$ alkyl, straight-chain or branched $C_3$–$C_{18}$ alkyl which is interrupted by O, S or —NR4-, $C_5$–$C_{12}$ cycloalkyl, $C_6$–$C_{14}$ aryl, $C_7$–$C_{15}$ aralkyl, straight-chain or branched $C_3$–$C_8$ alkenyl, or $C_1$–$C_3$ hydroxyalkyl; R4 is H, straight-chain or branched $C_1$–$C_{18}$ alkyl, $C_6$–$C_{12}$ cycloalkyl, straight-chain or branched $C_3$–$C_8$ alkenyl, $C_6$–$C_{14}$ aryl or $C_7$–$C_{18}$ aralkyl;

each R12 is independently halogen, hydroxy, straight-chain or branched $C_{1-6}$ alkyl, straight-chain or branched $C_{1-6}$ alkoxy, straight-chain or branched $C_{1-6}$ alkanol, amino, straight-chain or branched $C_{1-6}$ alkylamino, or straight-chain or branched $C_{1-6}$ dialkylamino;

each R13 is independently halogen, hydroxy, straight-chain or branched $C_{1-6}$ alkyl, straight-chain or branched $C_{1-6}$ alkoxy, straight-chain or branched $C_{1-6}$ alkanol, amino, straight-chain or branched $C_{1-6}$ alkylamino, or straight-chain or branched $C_{1-6}$ dialkylamino;

a is 0 to 5; and b is 0 to 5.

Dimers of any of these ultraviolet light absorbing compounds can be used as well.

Other ultraviolet light absorbing compounds may also be used, provided they contain at least one amide group. Examples of such compounds include p-hydroxybenzoates, triazines and diphenylcyanoacrylates. The amide functional ultraviolet light containing compounds may be used alone or in combination in the materials and films of the invention.

The amide functional ultraviolet light absorbing compound is combined with a carboxyl functional polymer to produce the ultraviolet light absorbing material of the invention. The carboxyl functional polymer contains at least one monomer having a pendant carboxyl (—COOH) group. At least one hydrogen bonding site, which may be a —COOH group or other appropriate group such as a —COOR group wherein R is $C_{1-18}$ alkyl, should be present per molecule of amide functional ultraviolet light absorbing compound to allow for adequate formation of hydrogen bonds between the carboxyl functional polymer and the amide functional ultraviolet light absorbing compound. Carboxyl functional polymers useful in the invention typically have an acid number of about 40 to about 180.

Monomers useful in the formation of the carboxyl functional polymer include the ethylenically unsaturated carboxylic acids. Homopolymers or copolymers of such carboxy bearing monomers may be used. The copolymer may contain different carboxy bearing monomers, or may contain a carboxy bearing monomer and a non-carboxy-bearing monomer. Examples of non-carboxy bearing monomers include ethylenically unsaturated carboxylic acid esters, olefins, vinyl compounds, and the like.

Suitable ethylenically unsaturated carboxylic acids include alkenoic and aralkenoic mono- di- and tri- carboxylic acids having up to 20 carbon atoms as well as acids having higher numbers of carboxyl groups. Examples of such acids include acrylic acid, methacrylic acid, fumaric acid, maleic acid, crotonic acid, itaconic acid and cinnamic acid. Of these, acrylic acid and methacrylic acid are preferred.

Comonomers that may be used in the preparation of the carboxyl functional polymer include olefins such as ethylene, propylene, and butylene; ethylenically unsaturated aromatic monomers that contain up to 20 carbon atoms such as styrene and vinyl toluene; ethylenically unsaturated esters of carboxylic acids that contain a total of up to 20 carbon atoms such as vinyl acetate; and the like. Of these, the olefins are a preferred class of comonomer, and ethylene is particularly preferred. Ethylene-acrylic acid copolymer is a particularly preferred carboxyl functional polymer. A commercially available example of a preferred ethylene-acrylic acid copolymer is PRIMACOR® available from Dow Chemical Co.

The carboxyl functional polymer is prepared using polymerization methods known in the art. Detailed information on polymer preparation may be found, for example, in the *Encyclopedia of Polymer Science and Engineering, Vol. 6*, Wiley & Sons 1986.

In addition to the carboxyl functional polymer and the amide functional ultraviolet light absorbing compound, other components may be present in the ultraviolet light absorbing material of the invention. Examples of such additives include antioxidants, preservatives, plasticizers, dyes, pigments, hindered amine light stabilizers (HALS), other stabilizers, and the like. The exact type and amount of additive used will vary according to the type of UVA and carboxyl functional polymer used and their relative proportions, the intended final use of the material, and other factors known to those of skill in the art.

The ultraviolet light absorbing material of the invention is prepared by combining the carboxyl functional polymer with the amide functional ultraviolet light absorbing compound. A sufficient amount of the UVA is present to provide good ultraviolet light absorbance without blooming or leaching out of the material. In general, about 0.05 to 25 wt-%, preferably about 0.05 to 5 wt-%, and most preferably about 0.5 to 2.5 wt-% of the amide functional ultraviolet light absorbing compound is present in the material, based on the total material weight.

The ultraviolet light absorbing material may be prepared by combining the amide functional ultraviolet light absorbing compound and the carboxyl functional polymer so that hydrogen bonding takes place between them. This may be accomplished by a number of different methods, including melt blending. The polymer and the UVA may also be compounded in an extruder. The presence of hydrogen bonds between the carboxyl functional polymer and the amide functional ultraviolet light absorbing compound may be verified by using analytical methods known in the art, such as by a shift in the IR spectrum of the material. See, for example, March, *Advanced Organic Chemistry, pp.*71–3 3d Ed., John Wiley and Sons (1985) and Symons, *Chem. Soc. Rev.* 12, pp.1–34 (1983).

The material thus formed may be used directly by forming into a film, or may be blended into other polymers which are then formed into films stabilized against the effects of ultraviolet light.

The Polymeric Film

The polymeric film of the invention is made up of the ultraviolet light absorbing material of the invention in combination with a polyolefin. The ultraviolet light absorbing material resists blooming and/or migration out of the polyolefin, thereby increasing the useful life of articles that are protected by the film, which is used as a top layer.

Polyolefins that may be used in the polymeric films of the invention include those polymers that are made from at least one olefinic monomer. Examples of such olefinic monomers include ethylene, propylene, butylene, and the like, with ethylene the preferred olefinic monomer.

The polyolefin may be a homopolymer of the olefinic monomer, or it may be a copolymer of different olefinic monomers or of an olefinic monomer and another monomer. The comonomer may be any monomer that can be co-polymerized with the olefinic monomer, so long as it does not result in incompatibility with the ultraviolet light absorbing material. Useful types of comonomers include ethylenically unsaturated carboxylic acids; ethylenically unsaturated carboxylic acid esters; vinyl containing monomers; and others known in the art. The ethylenically unsaturated carboxylic acids are a preferred class of comonomers, with acrylic acid especially preferred.

The polymeric film is prepared by combining the ultraviolet light absorbing material of the invention with a polyolefin. The ultraviolet light absorbing material is generally present in an amount high enough to provide the polyolefin with the ability to absorb ultraviolet light but not so high that the material migrates, separates, or blooms out of the polyolefin. Typically the polymeric film contains about 0.05 to 25 wt-%, preferably about 0.5 to 5 wt-% of the ultraviolet light absorbing compound, based on the total weight of the film.

The polymeric film may be prepared by blending a melt of the polyolefin with a melt of the ultraviolet light absorbing material with stirring continued until the mixture is uniform. After uniformity is achieved, the mixture may be pressed or formed into a film using methods known in the art. The film may also be prepared by co-extruding the polyolefin and the ultraviolet light absorbing material directly into the desired film.

Retroreflective Sheetings

The polymeric films of the invention may be used as the top layer or cover film of a multilayered retroreflective sheeting. Retroreflective sheetings are generally known in the art, as seen for example in Bailey et al., U.S. Pat. No. 4,767,659, which is incorporated herein by reference. Polymeric films of the invention may be used as cover films or overlays for embedded-lens and encapsulated-lens sheetings (both microsphere-based and cube corner type); protecting underlying layers of retroreflective elements, binder layers, etc. The polymeric films provide protection to the lower layers of the sheeting from ultraviolet light, thereby extending the useful life of the sheeting and articles that incorporate the sheeting.

In addition to providing protection from ultraviolet light, when used as the top layer of a retroreflective sheeting, the polymeric film in some instances should additionally be sufficiently extensible to withstand substantial stretching such as the embossing of a license plate, sufficiently soft that it resists localized delamination when stretched to conform to an irregular surface, and should have good impact resistance. Preferably, when used as the top layer of a retroreflective sheeting the polymeric film has an elongation of at least about 100%, good impact resistance, toughness, and transparency.

Retroreflective sheetings that have the polymeric film of the invention as a top layer typically contain multiple layers. One example of a suitable retroreflective sheeting is a sheeting article that may contain a binder layer; a layer of glass microspheres fully or partially embedded in the binder layer; a specularly reflective layer; and an adhesive layer covered by a removable liner. Other layers may be present as desired. Other types of retroreflective elements can be used if desired.

To prepare a retroreflective sheeting using the polymeric film of the invention, the film is laminated to a retroreflecting base material that contains multiple layers as described above.

The retroreflective sheetings prepared using the polymeric film of the invention may be applied to a wide variety of articles, including traffic signs, barriers, and cones, as well as embossed license or information plates. The preparation of embossed information plates is described in U.S. Pat. Nos. 5,085,918 and 5,227,194, both of which are incorporated herein by reference.

Conformable Marking Sheets

The polymeric films of the invention may also be used in the preparation of conformable pavement marking sheets. Illustrative examples of such conformable marking sheets are described in Lasch et al., U.S. Pat. No. 5,194,113, which is incorporated herein by reference.

When used in them preparation of a conformable marking sheet, the polymeric film should be sufficiently ductile to allow the sheet to conform to the surface of the pavement or other substrate in order to improves the adhesion of the sheet to the substrate. When used as a top layer in a conformable marking sheet, the polymeric film preferably includes a visibility enhancing pigment such as titanium dioxide or lead chromate.

The polymeric film top sheet or layer may be extruded or laminated directly onto the other layers of the conformable sheet, or an adhesive or other layer may be interposed between the top layer and other layers of the sheet.

The polymeric films of the invention may also be used as a marking sheet independent of a conforming layer. If used in this manner, the polymeric film may be laminated to a layer of pressure sensitive or other suitable adhesive to improve adhesion to the pavement or other substrate. A release liner may also be present to provide ease of handling and storage. In addition, particles may be fully or partially embedded in the top surface of the film to improve the retroreflectivity and/or skid resistance properties of the film.

The examples which follow are illustrative of the invention and are not intended to be limiting in any way.

EXAMPLES

The following materials were used in the procedure as of the examples:

BTOA is 3-(2H-benzotriazol-2-yl)-5-(1,1-dimethylethyl)-N-octyl-4-hydroxybenzenepropaneamide.

BTAA is 3-(2H-benzotriazol--yl)-5-(1,1-dimethylethyl)-N-(2-hydroxyethyl)-4-hydroxybenzene-propane amide.

BTME is 3-(2H-benzotriazol-2-yl)-5-(1,1-dimethylethyl)-4-hydroxybenzenepropanoic acid, methyl ester, available from Ciba-Geigy Corp. as CGL-571.

BTA is 2-(2'-hydroxy-5'-(2-hydroxyethyl)-benzotriazole, available as Norblock 6000 from Noramco Inc., New Brunswick, N.J.

PRIMACOR 3440 is an ethylene-acrylic acid copolymer available from Dow Chemical Company, USA of Midland, Mich. It contains nominally 9.5% by weight acrylic acid with a density of 0.938 as measured using ASTM D 792, a melt index of 10.0 as measured using ASTM D 128, and a crystallinity of approximately 33%.

DOWLEX 4001 is an ethylene-octene copolymer available from Dow Chemical Company, USA of Midland, Mich. It has a density of 0.912 as measured using ASTM D 792, a melt index of 1.0 as measured using ASTM D 1238, and a crystallinity of approximately 34%.

CYASORB UV 5411, 2-(2-Hydroxy-5-t-octylphenyl)-benzotriazole, is available from American Cyanamid Company, Wayne, N.J.

SYNTASE 800, 2-Hydroxy-4-n-octylbenzophenone, is available from Great Lakes Chemical Corporation, West Lafayette, Ind.

TINUVIN P, 2-(2'-Hydroxy-5'-methylphenyl)-benzotriazole, is available from Ciba Geigy Corporation, Hawthorne, N.Y.

Tinuvin 328, 2-(2'-Hydroxy-2', 5'-di-isopentyphenyl)-benzotriazole, is available from Ciba Geigy Corporation, Hawthorne, N.Y.

Absorption spectra were measured using a Beckman DU-70 UV-Visible spectrophotometer.

EXAMPLE 1

Preparation of 3-(2H-benzotriazol-2-yl)-5-(1,1-dimethylethyl)-N-octyl-4-hydroxybenzenepropaneamide (BTOA).

2000 g. (5.65 mole) of methyl 3-{3'-(2H-benzotriazol-2'-yl)-5"-tert-butyl-4'-hydroxyphenyl} propionate, sold by Ciba-Geigy as CGL-571, was mixed with 1473 g (11.4 mole) octylamine in a five liter three neck round bottom flask. The flask is equipped with a mechanical stirrer, pot thermometer and a distillation head, condenser and receiver. The mixture was heated with agitation to a pot temperature of 160° C., at which point distillate began to collect. Distillate was collected as the temperature rose to 170° C. A total of 450 g. of distillate was collected and removed.

The remaining reaction mixture was heated to 200° C. and held for one hour, then cooled to 150° C. Gas chromatography (GC) of an aliquot of the product showed no residual ester. An aspirator vacuum was applied and residual amine distilled, followed by application of a vacuum pump and continued distillation until the pot temperature reached 160° C. at 2 mm Hg of vacuum. GC of an aliquot showed <0.2% residual amine, indicating complete reaction.

The reaction was cooled to 120° C. and the molten product poured into aluminum trays. After cooling to room temperature, the product was ground into a fine powder.

The yield of product was 2504 g. (98%), with a melting point of 65–69° C. $^{13}$C NMR analysis of the product confirmed product structure and purity.

EXAMPLE 2

BTAA in EAA Film 12.5 g of BTAA, which may be prepared using the procedure of Example 1, replacing octylamine with ethanolamine, 2.5 g of CHIMASORB 944, and 500 g of Primacor 3440 were tumble blended. The mixture was extruded as a 2 mil (0.005 cm) film onto a 2 mil polyethylene terephthalate (PET) carrier film using a single screw extruder with three heating zones set at 350° F., 380° F., and 420° F. and a die temperature set at 420° F. The extruder was a ¾ inch single screw extruder for the Haake Rheocord as available from Haake of Karlsruhe, Germany. The film was stripped from the carrier and its absorption spectrum was measured over the range from 300 to 500 nm. For a 0.0045 cm free film at a nominal BTAA concentration of 2.4% by weight, the peak absorptions were: 2.13 A at 305 nm and 2.12 A at 349 nm.

EXAMPLE 3

BTOA in Ethylene-Acrylic Acid Copolymer (EAA) Film

BTOA and PRIMACOR 3440 mixed in different ratios as shown in the table below were tumble blended together. The mixtures were extruded as 2 mil (0.005 cm) films onto a 2 mil PET carrier film using a single screw extruder with three heating zones set at 350° F., 380° F., and 420° F. and a die temperature set at 420° F. The extruder was a ¾ inch single screw extruder for the Haake Rheocord as available from Haake of Karlsruhe, Germany. The film was stripped from the carrier and its absorption spectrum was measured over the range from 300 to 500 nm. The peak absorbences are shown in the table below.

over the range from 300 to 500 nm. The peak absorbences of each film are listed in the table.

| Compound | Film Caliper (cm) | Peak 1 | A1 | Peak 2 | A2 |
| --- | --- | --- | --- | --- | --- |
| None* | 0.0050 | 346 | 0.06 | 295 | 0.07 |
| Tinuvin 328 | 0.0048 | 348 | 2.95 | 304 | 2.94 |
| BTA | 0.0051 | 342 | 3.21 | 298 | 2.67 |
| BTME | 0.0055 | 346 | 3.56 | 302 | 3.34 |
| BTAA | 0.0041 | 346 | 2.74 | 304 | 2.75 |
| BTOA | 0.0050 | 346 | 3.06 | 302 | 3.05 |

*No peaks were noted for this film. The values listed in the table are provided to allow a comparison of the absorbance of a film without ultraviolet light absorbing compounds to that of films that incorporate such compounds.

| Example | g BTOA | g Primacor 3440 | Weight % BTOA | Film Caliper (cm) | Peak 1 | A1 | Peak 2 | A2 | A at 280 nm |
| --- | --- | --- | --- | --- | --- | --- | --- | --- | --- |
| 3-1 | 4.5 | 444.5 | 1.0 | 0.0046 | 348 | 1.83 | 304 | 1.87 | 0.80 |
| 3-2 | 9.0 | 441.0 | 2.0 | 0.0046 | 347 | 3.04 | 304 | 3.03 | 1.32 |
| 3-3 | 18.0 | 432.0 | 4.0 | 0.0046 | 348 | >4 | 302 | 3.88 | 2.08 |

COMPARATIVE EXAMPLE A

Tinuvin 328 in EAA 12.5 g of TINUVIN 328 from Ciba Geigy, 2.5 g of CHIMASSORB 944, and 500 g of PRIMACOR 3440 were tumble blended. The mixture was extruded as a nominal 2 mil (0.005 cm) film onto a 2 mil PET carrier film using a single screw extruder with three heating zones set at 350° F., 380° F., and 420° F. and a die temperature set at 420° F. The extruder was a ¾ inch single screw extruder for the Haake Rheocord as available from Haake of Karlsruhe, Germany. The film was stripped from the carrier and its absorption spectrum was measured over the range from 300 to 500 nm. For a 0.0043 cm free film at a nominal TINUVIN 328 concentration of 2.4% by weight, the peak absorptions were: 2.73 A at 305 nm and 2.71 A at 348 nm.

EXAMPLE 4

Ultraviolet Licrht Absorbing Compound Retention in EAA Films

The compounds listed in the table below were incorporated into polyolefin films as follows. 10.0 g of the indicated compound, 5.0 g of CHIMASORB 944, and 485 g of PRIMACOR 3440 were tumble blended. The mixture was extruded as a 2 mil (0.005 cm) film onto a 2 mil PET carrier film using a single screw extruder with three heating zones set at 350° F., 380° F., and 420° F. and a die temperature set at 420° F. A film containing no ultraviolet light absorbing compound was also extruded. The extruder was a ¾ inch single screw extruder for the Haake Rheocord as available from Haake of Karlsruhe, Germany. The film was stripped from the carrier and its absorption spectrum was measured

| Molecular Weights | |
| --- | --- |
| Tinuvin 328 | 351 |
| BTA | 255 |
| BTME | 353 |
| BTAA | 383 |
| BTOA | 450 |

Each of these films was mounted onto an aluminum slide frame and placed in a 160° F. air circulating oven to evaluate retention of the ultraviolet light absorbing compounds upon heat aging. The initial peak absorbences were measured prior to placing the films in the oven. Periodically, the films were removed from the oven and the absorbences remeasured at the initial peak wavelengths. The results are illustrated in FIG. 1, which shows the change in the peak absorbance measured between 340 and 350 nm as a function of total heat aging time.

EXAMPLE 5

Preparation of Ultraviolet Light Absorbing Material

UVA concentrates in PRIMACOR 3440 were prepared using a twin screw extruder. The UVAs were tumble blended with PRIMACOR 3440 according to the table below. Each mixture was compounded on a twin screw extruder with two heating zones set at 162° C. and 177° C. The extruder was a Baker-Perkins gear drive variable speed twin screw extruder powered by a Haake Rheocord Torque Rheometer as available from Haake of Karlsruhe, Germany. The mixture was extruded as a ⅛ inch strand which was then cut into ⅛ inch pellets.

| UVA | g UVA | g Primacor 3440 | Weight % UVA |
|------|-------|-----------------|--------------|
| BTAA | 100 | 900 | 10 |
| BTOA | 220 | 4180 | 5 |

EXAMPLE 6

Incorporation of Ultraviolet Light Absorbing Material Into LDPE Film 30 g of a 10% BTAA concentrate prepared as in Example 5 was tumble blended with 370 g of DOWLEX 4001. The mixture was extruded as a 2 mil (0.005 cm) film onto a 2 mil PET carrier film using a single screw extruder with three heating zones set at 350° F., 380° F., and 420° F. and a die temperature set at 420° F. The extruder was a ¾ inch single screw extruder for the Haake Rheocord as available from Haake of Karlsruhe, Germany. The film was stripped from the carrier and its absorption spectrum was measured over the range from 300 to 500 nm. For a 0.0056 cm free film at a nominal BTAA concentration of 1% by weight, the peak absorptions were: 1.34 A at 304 nm and 1.32 A at 346 nm.

COMPARATIVE EXAMPLE B

TINUVIN 328 in LDPE Film 4 g of TINUVIN 328 was tumble blended with 396 g of DOWLEX 4001. The mixture was extruded as a 2 mil (0.005) cm film onto a 2 mil PET carrier film using a single screw extruder with three heating zones set at 350° F., 380° F., and 420° F. and a die temperature set at 420° F. The extruder was a ¾ inch single screw extruder for the Haake Rheocord as available from Haake of Karlsruhe, Germany. The film was stripped from the carrier and its absorption spectrum was measured over the range from 300 to 500 nm. For a 0.0056 cm free film at a nominal TINUVIN 328 concentration of 1% by weight, the peak absorptions were: 1.85 A at 304 nm and 1.82 A at 348 nm.

EXAMPLE 7

Ultraviolet Light Absorbing Compound Retention in LDPE Films

Figure 2:
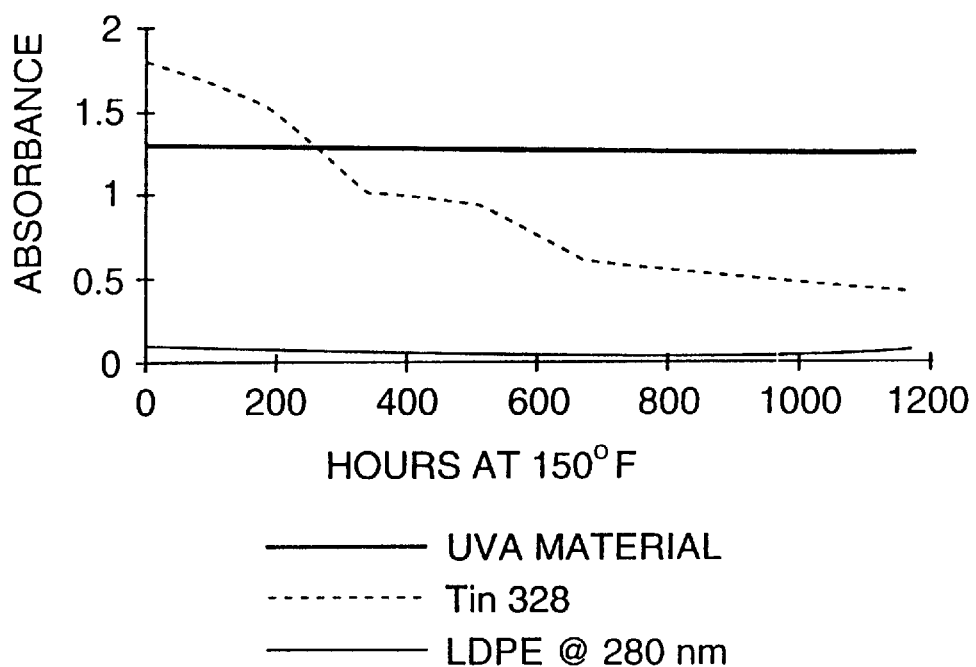
FIG. 2 shows the retention of ultraviolet light absorbing material in a low-density polyethylene (LDPE) when subjected to heat aging.

The films from Example 6 and Comparative Example B along with a DOWLEX 4001 film containing no additional ultraviolet light absorbing compounds were mounted onto an aluminum slide frame and placed in a 150° F. static oven to evaluate retention of the ultraviolet light absorbing compounds upon heat aging. The initial peak absorbences were measured prior to placing the films in the oven; these values are shown in the table below. Periodically, the films were removed from the oven and the absorbences remeasured at the initial peak wavelengths. The results are illustrated in FIG. 2, which shows the change in the peak absorbance of the Tinuvin 328 and the material of the invention measured between 340 and 350 nm as a function of total heat aging time. The absorbance of the film containing no ultraviolet light absorbing compound is provided for reference.

| Compound | Weight % | Film Caliper (cm) | Peak 1 | A1 | Peak 2 | A2 | A at 280 nm |
|----------|----------|-------------------|--------|------|--------|------|-------------|
| None* | 0 | 0.0056 | 346 | 0.07 | 302 | 0.08 | 0.11 |
| Tinuvin 328 | 1 | 0.0056 | 348 | 1.82 | 304 | 1.85 | 0.80 |
| BTAA | 1 | 0.0056 | 346 | 1.32 | 304 | 1.34 | 0.75 |

*No peaks were noted for this film. The values listed in the table are provided to allow a comparison of the absorbance of a film without added ultraviolet light absorbing compound to that of films that incorporate such compounds.

COMPARATIVE EXAMPLE C

Ultraviolet Light Absorbing Compound Retention in EAA Films

Figure 3:
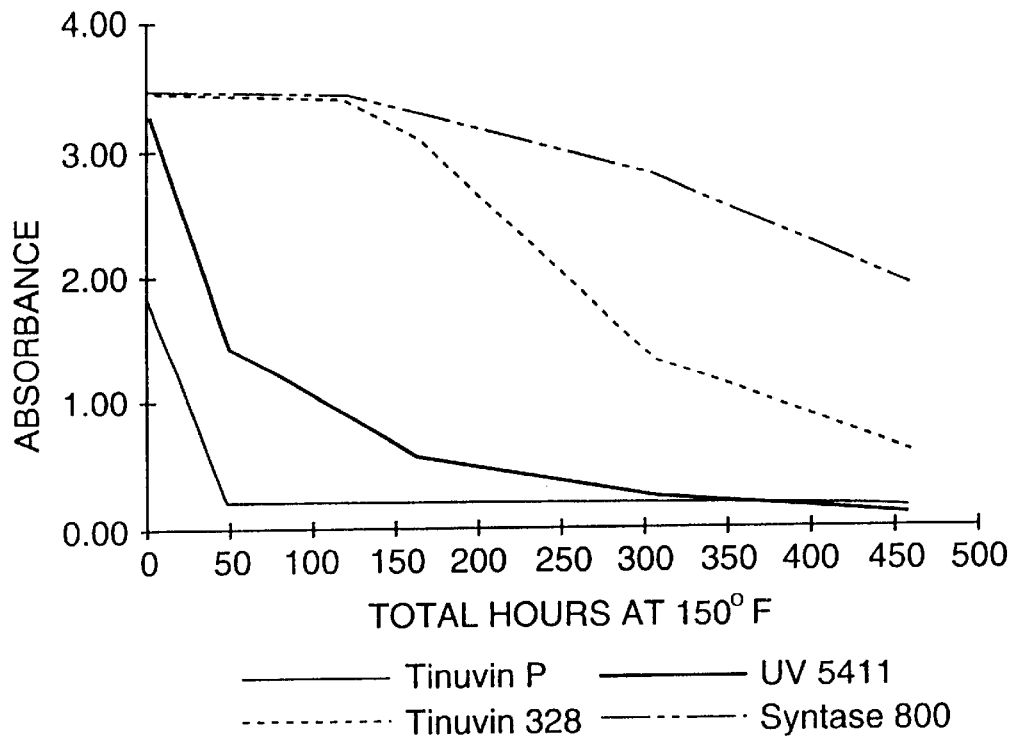
FIG. 3 shows the retention of ultraviolet light absorbing compounds in EAA films.

The compounds in the table below were each blended with PRIMACOR 3440 and extruded as 2 mil films as in Example 2. Each of the films was mounted onto an aluminum slide frame and placed in a 150° F. air circulating oven to evaluate retention of the compound upon heat aging. The absorbance of each film at 300 nm was measured prior to placing the films in the oven. Periodically, the films were removed from the oven and the absorbance remeasured. The results are illustrated in FIG. 3 which shows the change in the absorbance measured at 300 nm as a function of total heat aging time.

| Compound | Weight % as Charged | Film Caliper cm | Molecular Weight |
|----------|---------------------|-----------------|------------------|
| Tinuvin P | 2.6 | 0.0056 | 225 |
| CYASORB 5411 | 1.9 | 0.0061 | 323 |
| Tinuvin 328 | 4.0 | 0.0064 | 351 |
| SYNTASE 800 | 2.9 | 0.0069 | 326 |

EXAMPLE 8

Construction of Retroreflective Sheetings

Films prepared as in Example 4 were incorporated into retroreflective sheeting constructions in the following manner. Nominal 1.3 mil PRIMACOR 3440 films containing 1%, 2%, and 3% by weight BTAA were laminated as cover films to 3M brand SCOTCHLITE™ Reflective Sheeting 3750 in the manner described in Example 1 of U.S. Pat. 4,767,659.

COMPARATIVE EXAMPLE D

Construction Comprising a Film Containing No Ultraviolet Light Absorbing Compound A film prepared as in Comparative Example A containing no ultraviolet light absorbing compound was incorporated into a retroreflective sheeting construction in the following manner. A nominal 2 mil PRIMACOR 3440 film was laminated as a cover film to 3M brand SCOTCHLITE™ Reflective Sheeting 3750 in the manner described in Example 1 of U.S. Pat. No. 4,767,659.

EXAMPLE 9

Simulated Weathering Resistance

Figure 4:
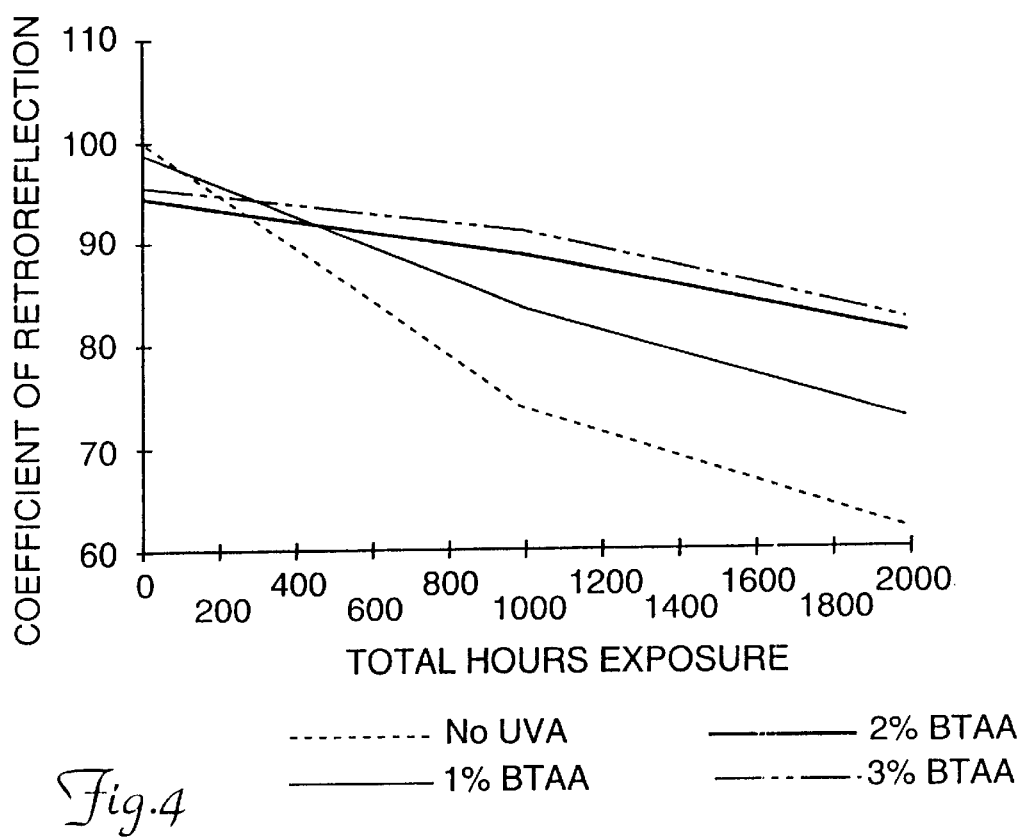
FIG. 4 shows the weathering resistance of retroreflective sheetings that incorporate UVA containing films of the invention.

Retroreflective sheetings of Example 8 and Comparative Example D were tested for weatherability in a weatherometer. The sheetings were applied to aluminum test panels and exposed for 2000 hours under the conditions called out in ASTM G23 Type E. The coefficient of retroreflection was measured before exposure at 0.2° observation angle and −4° entrance angle in accordance with ASTM E810, and remeasured at exposure intervals of 1000 hours. The results are presented in FIG. 4.

Although the foregoing specification provides a full and complete description of the invention, it is understood that changes can be made without departing from the spirit and scope of the invention.

We claim:

1. A polymeric film comprising a polyolefin and an ultraviolet light absorbing material, said ultraviolet light absorbing material comprising a carboxyl functional polymer and an amide functional ultraviolet light absorbing compound, wherein the amide functional ultraviolet light absorbing compound is hydrogen-bonded to the carboxyl functional polymer and there is at least 1 hydrogen bonding site on the polymer per mole of ultraviolet light absorbing compound.

2. The film of claim 1 wherein the carboxyl functional polymer comprises an ethylene-acrylic acid copolymer.

3. The film of claim 1 wherein the carboxyl functional polymer is acrylic acid polymer, methacrylic acid polymer, or a copolymer thereof.

4. The film of claim 1 wherein the polyolefin is an ethylene-acrylic acid copolymer.

5. The film of claim 1 wherein the amide functional ultraviolet light absorbing compound is present in an amount of about 0.05 to 5.0 wt-%, based on the total film weight.

6. The film of claim 1 wherein the amide functional ultraviolet light absorbing compound contains a 2-hydroxyphenylbenzotriazole moiety.

7. The film of claim 1 wherein the amide functional ultraviolet light absorbing compound is a compound of formula (I):

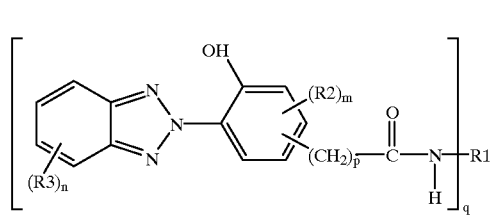

(I)

wherein R1 is straight-chain or branched $C_1$–$C_{18}$ alkyl, straight-chain or branched $C_3$–$C_{18}$ alkyl which is interrupted by O, S or —NR4-, $C_5$–$C_{12}$ cycloalkyl, $C_6$–$C_{14}$ aryl, $C_7$–$C_{15}$ aralkyl, straight-chain or branched $C_3$–$C_8$ alkenyl, $C_1$–$C_3$ hydroxyalkyl or

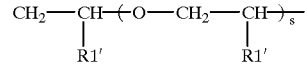

wherein R1' is H or straight-chain or branched $C_{1-6}$ alkyl; R4 is H, straight-chain or branched $C_1$–$C_{18}$ alkyl, $C_6$–$C_{12}$ cycloalkyl, straight-chain or branched $C_3$–$C_8$ alkenyl, $C_6$–$C_{14}$ aryl or $C_7$–$C_{18}$ aralkyl;

each R2 is independently halogen, hydroxy, straight-chain or branched $C_{1-6}$ alkyl, straight-chain or branched $C_{1-6}$ alkoxy, straight-chain or branched $C_{1-6}$ alkanol, amino, straight-chain or branched $C_{1-6}$ alkylamino, or straight-chain or branched $C_{1-6}$ dialkylamino;

each R3 is independently halogen, hydroxy, straight-chain or branched $C_{1-6}$ alkyl, straight-chain or branched $C_{1-6}$ alkoxy, straight-chain or branched $C_{1-6}$ alkanol, amino, straight-chain or branched $C_{1-6}$ alkylamino, or straight-chain or branched $C_{1-6}$ dialkylamino;

m is 0 to 3;
n is 0 to 4;
p is 1 to 6;
q is 1 or 2; and
s is 2 to 10.

8. The film of claim 1 wherein the amide functional ultraviolet light absorbing compound is a compound of formula (II):

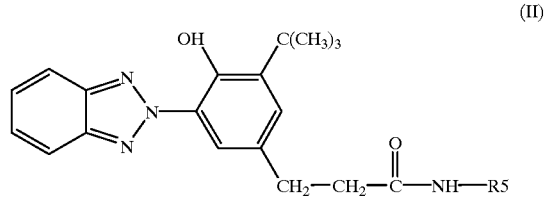

(II)

wherein R5 is a straight-chain or branched $C_8$ alkyl group.

9. The film of claim 8 wherein R5 is n-octyl or 2-ethylhexyl.

10. The film of claim 1 wherein the amide functional ultraviolet light absorbing compound contains a 2-hydroxybenzophenone moiety.

11. The film of claim 1 wherein the amide functional ultraviolet light absorbing compound is a compound of formula (III):

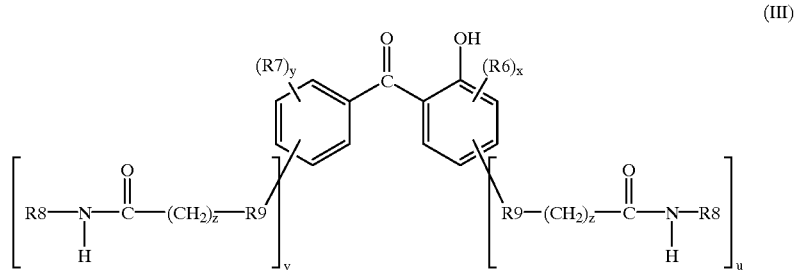

(III)

wherein each R8 is independently straight-chain or branched $C_1$–$C_{18}$ alkyl, straight-chain or branched $C_3$–$C_{18}$ alkyl which is interrupted by O, S or —NR10-, $C_5$–$C_{12}$ cycloalkyl, $C_6$–$C_{14}$ aryl, $C_7$–$C_{15}$ aralkyl, straight-chain or branched $C_3$–$C_8$ alkenyl, or $C_1$–$C_3$ hydroxyalkyl; each R9 is independently a covalent bond, —O—, —S—, —CO—, or —NR10-; R10 is H, straight-chain or branched $C_1$–$C_{18}$ alkyl, $C_6$–$C_{12}$ cycloalkyl, straight-chain or branched $C_3$–$C_8$ alkenyl, $C_6$–$C_{14}$ aryl or $C_7$–$C_{18}$ aralkyl;

each R6 is independently halogen, hydroxy, straight-chain or branched $C_{1-18}$ alkyl, straight-chain or branched $C_{1-18}$ alkoxy, straight-chain or branched $C_{1-18}$ alkanol, amino, straight-chain or branched $C_{1-6}$ alkylamino, or straight-chain or branched $C_{1-6}$ dialkylamino;

each R7 is independently halogen, hydroxy, straight-chain or branched $C_{1-18}$ alkyl, straight-chain or branched $C_{1-18}$ alkoxy, straight-chain or branched $C_{1-18}$ alkanol, amino, straight-chain or branched $C_{1-6}$ alkylamino, or straight-chain or branched $C_{1-6}$ dialkylamino;

u and v are independently 0 or 1, provided that u+v=at least 1;

x is 0 to 4;

y is 0 to 5; and each z is independently 1 to 6.

12. The film of claim 1 wherein the amide functional ultraviolet light absorbing compound is a compound of formula (IV) or (V):

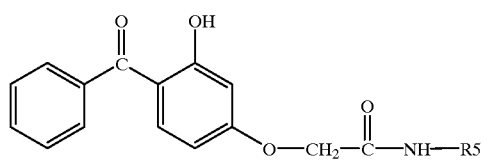

(IV)

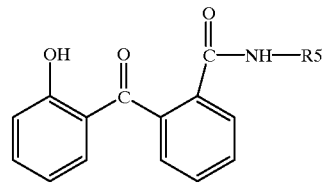

(V)

wherein R5 is a straight-chain or branched $C_8$ alkyl group.

13. The film of claim 12 wherein R5 is n-octyl or 2-ethylhexyl.

14. A method of protecting a substrate from the effects of ultraviolet light, the method comprising applying a polymeric film to the substrate, said film comprising a polyolefin and an ultraviolet light absorbing material, said ultraviolet light absorbing material comprising a carboxyl-functional polymer and an amide functional ultraviolet light absorbing compound, wherein the ultraviolet light absorbing compound is hydrogen bonded to the carboxyl-functional polymer and there is at least one hydrogen bonding site on the polymer per mole of ultraviolet light absorbing compound.

15. The method of claim 14 wherein the polyolefin comprises an ethylene-acrylic acid copolymer.

16. The method of claim 14 wherein the carboxyl functional polymer comprises an ethylene-acrylic acid copolymer.

17. The method of claim 14 wherein the carboxyl functional polymer comprises acrylic acid, methacrylic acid, or a copolymer thereof.

18. The method of claim 14 herein the amide functional ultraviolet light absorbing compound contains a 2-hydroxyphenylbenzotriazole moiety.

19. The method of claim 14 wherein the amide functional ultraviolet light absorbing compound is a compound of formula (II):

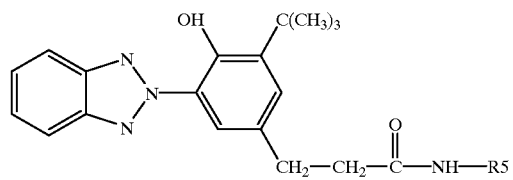

(II)

wherein R5 is a straight-chain or branched $C_8$ alkyl group.

20. The method of claim 14 wherein the amide functional ultraviolet light absorbing compound contains a 2-hydroxybenzophenone moiety.

21. The method of claim 14 wherein the amide functional ultraviolet light absorbing compound is a compound of formula (IV) or (V):

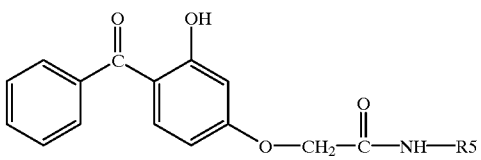

(IV)

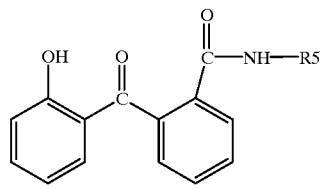

(V)

wherein R5 is a straight-chain or branched $C_8$ alkyl group.

22. The method of claim 14 wherein the amide functional ultraviolet light absorbing compound contains a diphenylcyanoacrylamide or diphenylcyanoacrylate group.

23. A conformable marking sheet comprising:
(a) a top polymeric film layer having glass microspheres and skid resistant particles partially embedded therein, the film comprising a polyolefin and an ultraviolet light absorbing material, the ultraviolet light material comprising a carboxyl functional polymer and an amide functional ultraviolet light absorbing compound, wherein the amide functional ultraviolet light absorbing compound is hydrogen bonded to the carboxyl functional polymer and there is at least one hydrogen bonding site on the polymer per mole of ultraviolet light absorbing compound;
(b) a base layer; and
(c) an adhesive layer.

24. An enclosed-lens retroreflective sheeting comprising a layer of retroreflective elements and a top layer comprising a polymeric film, said film comprising a polyolefin and an ultraviolet light absorbing material, said ultraviolet light absorbing material comprising a carboxyl functional polymer and an amide functional ultraviolet light absorbing compound, wherein the amide functional ultraviolet light absorbing compound is hydrogen-bonded to the carboxyl functional polymer and there is at least 1 hydrogen bonding site on the polymer per molecule of ultraviolet light absorbing compound.

25. A reflective sign comprising the retroreflective sheeting of claim 24.

26. The film of claim 1 which is an extruded film.

* * * * *

UNITED STATES PATENT AND TRADEMARK OFFICE
CERTIFICATE OF CORRECTION

PATENT NO.   : 6,150,440
DATED        : November 21, 2000
INVENTOR(S)  : Olson et al.

It is certified that error appears in the above-identified patent and that said Letters Patent is hereby corrected as shown below:

Column 5,
Line 2, "—NR10-" should read -- —NR10— --.
Line 5, "—NR10-" should read -- —NR10— --.
Line 16, "ranched" should read -- branched --.

Column 6,
Line 14, "—NR4-" should read -- —NR4— --.

Column 9,
Line 30, "improves" should read -- improve --.
Line 52, "procedure as" should read -- procedures --.
Line 56, "3-(2H-benzotriazol—y)" should read -- 3-(2H-benzotriazol-2-yl) --.

Column 10,
Line 19, "tinuvin" should read -- TINUVIN --.
Lines 30-31, "3-{3'(2H-benzotriazol-2'-yl)-5"-tert-butyl-4'-hydroxyphenyl}" should read -- 3-{3'-)2H-benzotriazol-2"-yl)-5'-tert-butyl-4'-hydroxyphenyl}--.
Line 60, replace "Chimasorb" with -- CHIMASSORB --, and after "944", insert -- a polymer of N,N'-bis(2,2,6,6-tetramethyl-4-piperidinyl)-1,6-hexanediamine with 2,4-dichloro-6-[(1,1,3,3-tetramethylbutyl)amino]-1,3,5-triazine)] --.
Line 61, "Primacor" should read -- PRIMACOR --.

Column 11,
Line 27, "Primacor" should read -- PRIMACOR --.
Line 36, "Tinuvin" should read -- TINUVIN --.
Line 53, "Licrht" should read -- light --.
Line 58, "CHIMASORB" should read -- CHIMASSORB --.

Column 12,
Line 11, "Tinuvin" should read --TINUVIN --.
Line 37, "Tinuvin" should read --TINUVIN --.

UNITED STATES PATENT AND TRADEMARK OFFICE
CERTIFICATE OF CORRECTION

PATENT NO.    : 6,150,440
DATED         : November 21, 2000
INVENTOR(S)   : Olson et al.

It is certified that error appears in the above-identified patent and that said Letters Patent is hereby corrected as shown below:

Column 13,
Line 1, "Primacor" should read -- PRIMACOR --.
Line 64, "Tinuvin" should read --TINUVIN --.

Column 14,
Line 7, "Tinuvin" should read --TINUVIN --.
Line 35, "Tinuvin" should read --TINUVIN --.
Line 37, "Tinuvin" should read --TINUVIN --.

Signed and Sealed this

Fifth Day of February, 2002

*Attest:*

JAMES E. ROGAN
*Attesting Officer*    *Director of the United States Patent and Trademark Office*